United States Patent [19]
Cirasole et al.

[11] Patent Number: 5,987,606
[45] Date of Patent: Nov. 16, 1999

[54] METHOD AND SYSTEM FOR CONTENT FILTERING INFORMATION RETRIEVED FROM AN INTERNET COMPUTER NETWORK

[75] Inventors: Peter Cirasole, Babylon; Robert DeRosa, Smithtown, both of N.Y.; Robert Fox, Danbury, Conn.

[73] Assignee: Bascom Global Internet Services, Inc., Farmingdale, N.Y.

[21] Appl. No.: 08/820,955

[22] Filed: Mar. 19, 1997

[51] Int. Cl.⁶ ...................................................... H04L 9/00
[52] U.S. Cl. ........................... 713/200; 713/201; 713/202
[58] Field of Search ............................... 395/186, 187.01, 395/188.01, 200.59, 200.33, 200.49, 200.58; 713/200, 201, 202

[56] References Cited

U.S. PATENT DOCUMENTS

| | | | |
|---|---|---|---|
| 5,673,322 | 9/1997 | Pepe et al. | 380/49 |
| 5,706,507 | 1/1998 | Schloss . | |
| 5,732,216 | 3/1998 | Logan | 395/200.33 |

OTHER PUBLICATIONS

*Internet Censorship: The Top Shelf,* The Economist, May 18, 1996, at 84.
*Surfwatch Filtering Products from Spyglass* (visited Oct. 7, 1996) <htt://www.surfwatch.com/products/surfwatch/datasheet.html>.
*Spyglass Server Application Development Interface* (visited Oct. 7, 1996) <http://www.spyglass.com/techspec/specs/adi_spec.html>.
*SurfWatch ProServer from Spyglass* (visited Oct. 7, 1996) <http://www.spyglass.com/products/proserver/>.
*Trove Investment—News Page* (visited Oct. 7, 1996) <http://www.netnanny.com/netnanny/nnfaq.html>.
*Trove Investment Corporation—Net Nanny Product Page* (visited Oct. 7, 1996) <http://www.netnanny.com/netnanny/product.html>.
*CYBERsitter Product Information* (visited Oct. 7, 1996) <http://www.solidoak.com/cysitter.htm>.
*Spyglass: Case Studies* (visited Oct. 7, 1996) <http://www.spyglass.com/cases/index.html>.

*Primary Examiner*—Ly V. Hua
*Attorney, Agent, or Firm*—Andrew F. Strobert; Skadden, Arps, Slate, Meagher & Flom LLP

[57] ABSTRACT

A method and system for filtering Internet content retrieved from an Internet computer network (110) by a remote Internet Service Provider ("ISP") server (100) and forwarded to a local client computer (10). The method and system matches at least one filtering scheme (121), such as an inclusive or exclusive filter, and at least one set of filtering elements (120), such as a list of allowed or excluded sites, to each Internet access request generated at the local client computer (10). The filtering scheme is implemented on the ISP server (100).

25 Claims, 6 Drawing Sheets

METHOD AND SYSTEM FOR CONTENT FILTERING INFORMATION RETRIEVED FROM AN INTERNET COMPUTER NETWORK

FIELD OF THE INVENTION

This invention relates generally to a method and system for filtering Internet content, and more particularly to a method and system for allowing an Internet Service Provider ("ISP") to perform user-customizable content filtering of information retrieved from the Internet.

BACKGROUND OF THE PRESENT INVENTION

The Internet contains a wealth of information for consumers, students and businesses. Users generally access this information through software known as a "browser," such as the Netscape Navigator™ or the Microsoft Explorer™. Browsers allow an end-user to access "web sites," which contain content typically in the form of HTML files. The browser software interprets the HTML data and provides the user with graphical images, textual data, audio sound or other forms of output. Other software utilities for accessing Internet content include News Groups, FTPs, IRC chat rooms and e-mail. Additionally, other traditional programs, such as games and database or spread-sheet programs, may also be programmed to directly access Internet content.

Many entities have found a need to block access to some web sites for certain end-users. For example, corporations may wish to allow their employees to access technical or business sites but not entertainment oriented sites, while families may wish to prevent access to sexually explicit or other objectionable information. Indeed, even advocates of free and open speech on the Internet have recognized the need for technology which allows for individualized self-censorship of the content of information received as a means to avoid government censorship of the content which is posted on the Internet.

Software developers have attempted to allow some control over the content of information received on end-user machines ("clients") by filtering the information available. Several mechanisms for filtering are available: exclusive filtering ("black-listing") which prevents access to all sites on a predetermined list of Internet sites; inclusive filtering ("white-listing") which allows access only to a predetermined list of Internet sites; and word-screening or phrase-screening which prevents access to web site "pages" which contain any word or phrase on a predetermined list. Other methods of filtering include blocking access to "newsgroups"—open discussion areas that allow users to easily interact and post content. Another filtering method is the Platform for Internet Content Selection (PICS) standard which allows individual Internet content providers to self-label their content according to standard criteria. PICS also allows for third party labeling of sites.

Initial attempts at Internet content control implemented the filter function on the local (client) machine. FIG. 8 shows a typical prior art configuration, implementing inclusive or exclusive filtering where the client personal computer 500 stores a database 501 of allowed (inclusive) or disallowed (exclusive) Internet sites. Client 500 is connected through an asynchronous dial-up line 502 to the Internet Service Provider ("ISP") server 503. The ISP server 503 is typically connected via a high speed connection 504 such as a T-1, T-3 or greater, to the global Internet 505. There are several disadvantages with this single-user configuration. First, it is subject to be modified or thwarted by a computer literate end-user, such as a teenager or corporate employee. Second, in either the home, school or corporate environment, it is difficult and time consuming to install on every end-user's client machine. Third, this configuration is dependent upon individual end-user hardware and operating systems and requires modified software for different end-user platforms. Finally, the client database 501 must be updated frequently to track changes in the content of various Internet sites. This requires frequent downloads from the Internet or disk updates.

A variation of the single-user configuration of FIG. 8 is shown in FIG. 9. In this local server-based configuration, a plurality of client computers 520, running any of a number of platforms such as Windows™, MacOS™ or Unix,™ are coupled to a local area network 521. The local area network 521 is connected to the ISP server 523 through a local server 522 and a dial-up or fixed connection 524. End-user requests for Internet content are filtered by the local server 522. The local server 522 accesses its stored database 525 and utilizes a single set of filtering criteria for all of the end-users of the client computers 520. This is disadvantageous because a single set of filtering criteria is often not appropriate for all of the end-users. While this local server configuration makes it far more difficult for a computer literate end-user to modify or thwart the system, it suffers from many of the disadvantages of the single-user configuration in that it requires time-consuming local service to initiate and maintain the system on the local server 522. Many organizations do not have the resources and expertise to install and maintain such a system. Further, while this configuration can often be used with a variety of end-user platforms, software implementing the filtering functions is typically tied to a single local area network or a local server platform.

Additionally, some service providers, such as America Online, have used a third "server-based" configuration where the filtering function is performed at the remote server site. To the inventors' knowledge, however, each of the existing systems implementing this server-based configuration utilize a single set of filtering criteria for all of their controlled-access end-users. Thus, while this system solves some of the problems associated with the local server configuration above, it still suffers from the fact that a single set of filtering criteria is not appropriate for all end-users. Accordingly, there exists a need for a remote ISP server based method and system for filtering Internet content received by controlled access subscribers on an individually customizable basis.

SUMMARY OF THE INVENTION

The object of the present invention is to overcome these and other disadvantages of the prior art systems by providing individual end-user customizable access control filtering and data storage on the ISP server. These objectives include providing an Internet access system which: requires no special or proprietary software to be installed at the user's site, such as on an end-user (client) computer or a local server; will work with any user hardware or operating system platform or local-area networks; allows users to select filtering schemes, such as inclusive or exclusive filtering, and filtering elements, such as ISP provided inclusive-lists or exclusive-lists, or their own customized inclusive-lists or exclusive-lists; and is difficult to tamper with or circumvent.

The method and system of the present invention includes an ISP server which executes or interprets software incorporating one or more filtering schemes and accesses databases including any filtering elements required by the filtering scheme. Individual end-user accounts are matched by the ISP server to the filtering scheme and the individualized set of database filtering elements associated with the end-user account. For example, a controlled access end-user account may be matched to an exclusive-list filtering scheme and a database of restricted sites. Alternatively, the controlled access end-user account may be matched to word-screening or phrase-screening filter and a database of restricted words or phrases and context rules. In a preferred embodiment of the present invention, the ISP server further includes end-user databases containing additional sets of filtering elements for further customizing the filtering scheme. While the ISP server preferably accesses the filtering schemes and filtering elements directly from main memory or local storage, the filtering schemes and filtering elements may, alternatively, be located remotely on other servers, or ISP servers, and be accessed through the Internet or a separate computer network connecting the ISP server to the data.

BRIEF DESCRIPTION OF THE DRAWINGS

For a more complete understanding of the present invention, reference is made to the following Detailed Description taken in connection with the accompanying drawings in which.

DETAILED DESCRIPTION

Preferred embodiments of the present invention will now be described with continued reference to the drawings.

Figure 1:
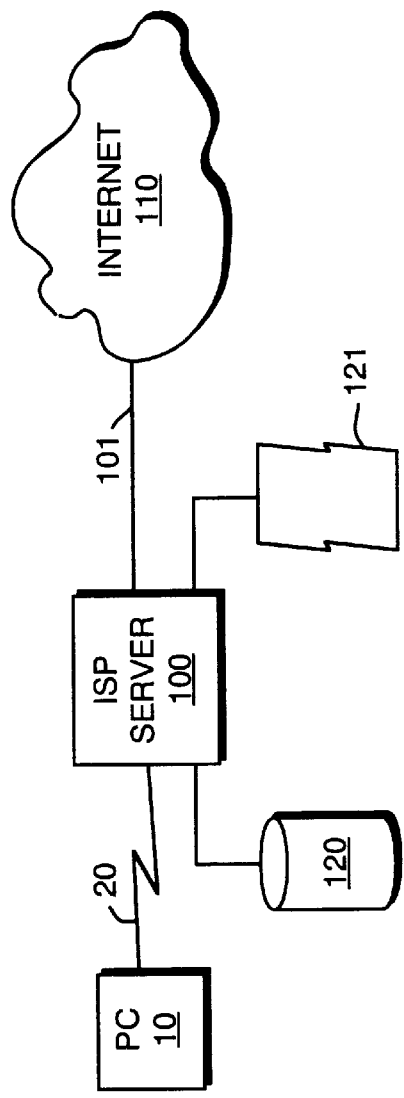
FIG. 1 is single-user configuration embodying the present invention.
Figure 2:
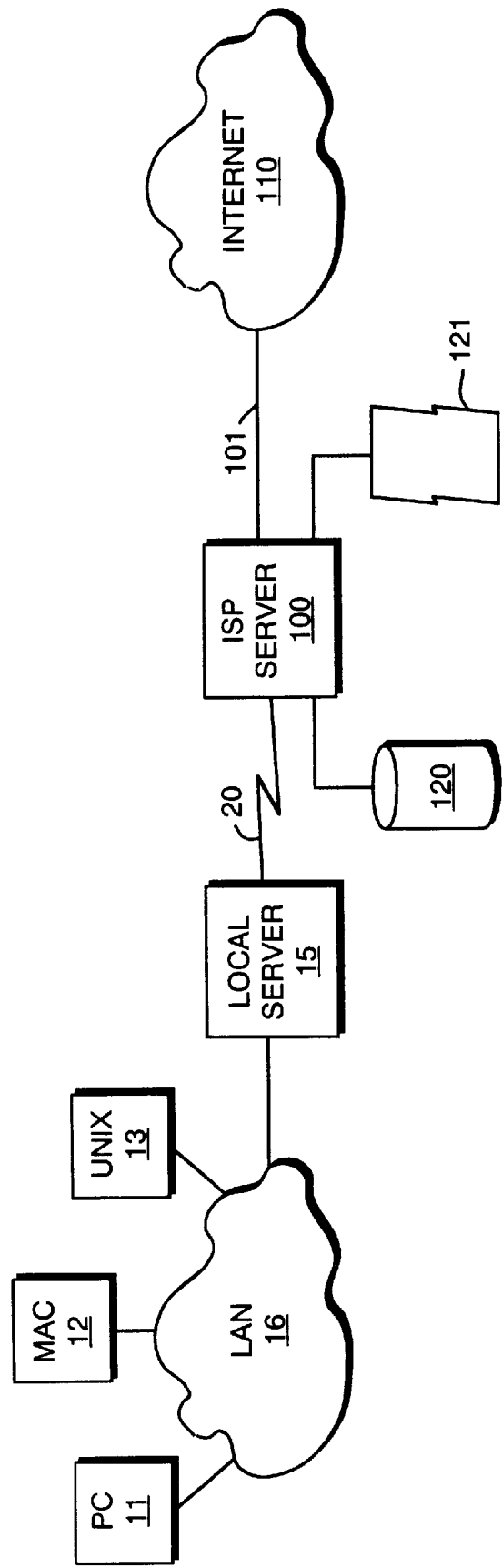
FIG. 2 is a multiple-user local area network based configuration embodying the present invention.

FIGS. 1 and 2 show single-user and multiple-user local area network configurations, respectively, embodying the present invention. In the single-user configuration, local client 10 is connected to the ISP server 100. The connection 20 is typically a dial-up asynchronous telephone line, but may be any of a number of known means, such as a cable connection or a continuous direct connection.

In the multiple-user local area network a plurality of clients, shown as 11, 12 and 13 on FIG. 2, are coupled to a local server 15 through local area network 16. The clients, 11, 12 and 13 as shown, may be using any of a number of platforms such as the Windows™, MacOS™, or Unix™ operating systems. The clients communicate with the ISP server 100 through local server 15 and connection 20. In this embodiment, connection 20 is preferred to be a continuous direct connection.

The ISP server 100 typically provides a plurality of end-users, or subscribers, with access to the Internet 110. The ISP server 100 is coupled to the Internet 110, preferably through a high speed connection 101, such as a T-3 line. Communications across the Internet 110 and ISP servers is through the Transmission Control Protocol/Internet Protocol (TCP/IP). Preferably, the clients, 10 on FIGS. 1 and 11, 12 and 13 on FIG. 2, also communicate with ISP server 100 using the TCP/IP protocol, although other proprietary or public protocols may also be supported.

The ISP server 100 typically includes at least one filter scheme 121, stored in main memory or other storage, and a database 120 of a plurality of sets of filtering elements associated with individual end-users. The filtering scheme may consist of any type of code which may be "executed," including object codes, interpreted code, such as Java™ or JavaScript™, other high-level code, or combinations thereof. The filtering scheme may be customized by combining portions of other filtering schemes, such as through a high-level language or visual editor.

The embodiment described below utilizes a single filtering scheme shown in FIG. 6 and sets of filtering elements consisting of a master inclusive-list and a personal inclusive-list and a personal exclusive-list. Accordingly, in the embodiment described, each controlled access end-user will be associated with a set of filtering elements comprising a master inclusive-list and a personal inclusive-list and a personal exclusive-list. However, it will be obvious to one of ordinary skill in the art that the filtering scheme can be any of a number of known-schemes, or hybrids thereof. The types of sets of filter elements will also be different depending on the filtering scheme. Thus, when using a word-screening type filtering scheme, the sets of filtering elements may consist of master lists of disallowed words or phrases together with individual words, phrases or rules.

Figure 3:
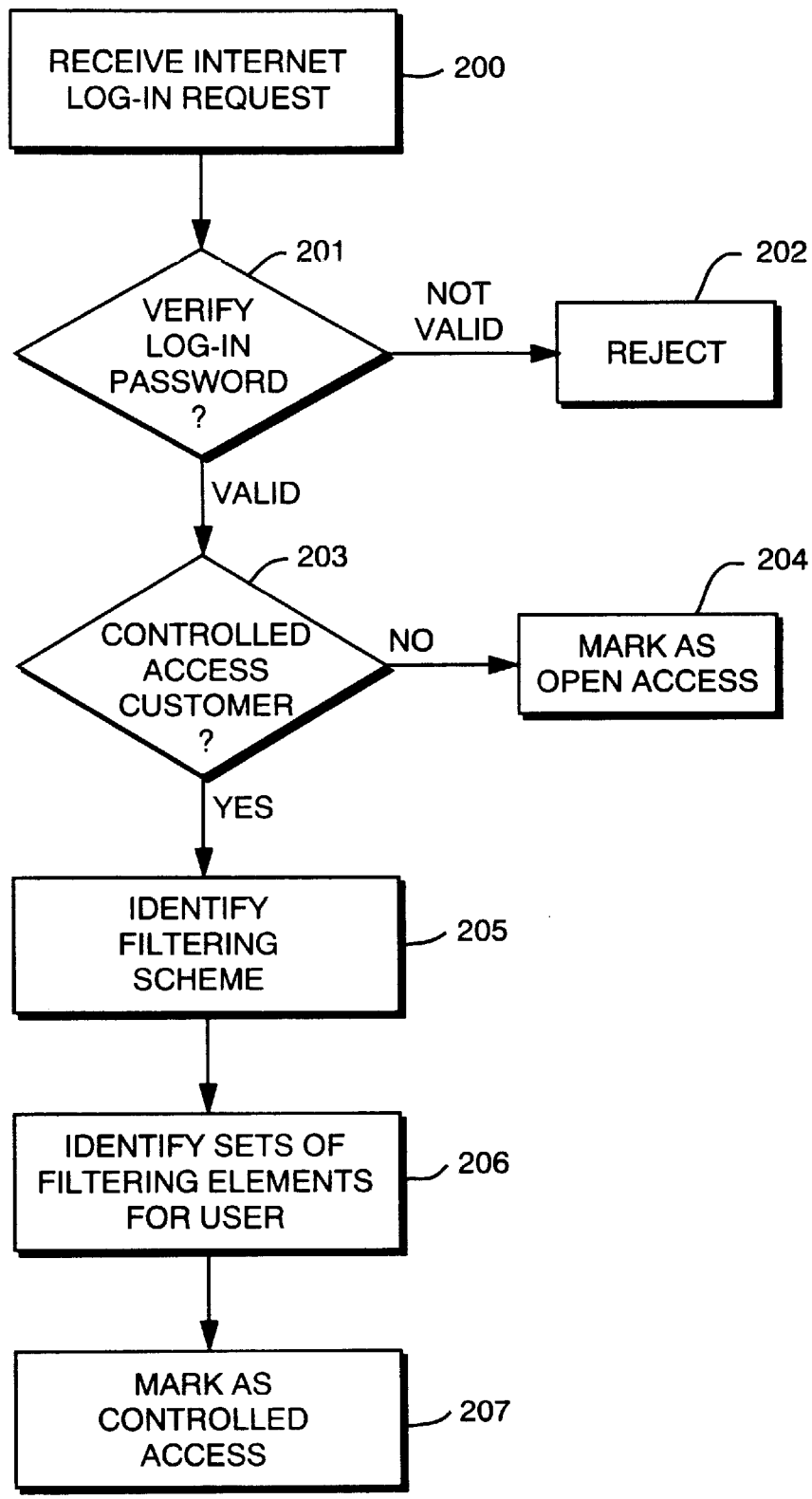
FIG. 3 is a flow diagram showing the ISP server's process for processing an Internet log-in request.

FIG. 3 shows the ISP server 100 process for accepting a log-in request 200, the ISP server 100 first verifies 201 whether the user is a registered subscriber. Invalid users are sent a rejection notice 202. The ISP server 100 then determines 203 whether the end-user is a controlled access subscriber. If not, the connection is marked 204 as an open access connection. If the end-user is a controlled access subscriber, the log-in process identifies the filtering scheme 205 and the filtering elements 206 associated with the end-user. The connection is marked 207 as a controlled access connection. The ISP server 100 may utilize a single filtering scheme for all controlled access users, in which case, individualized customization is achieved solely through the individualization allowed by modifying the filtering elements.

Figure 4:
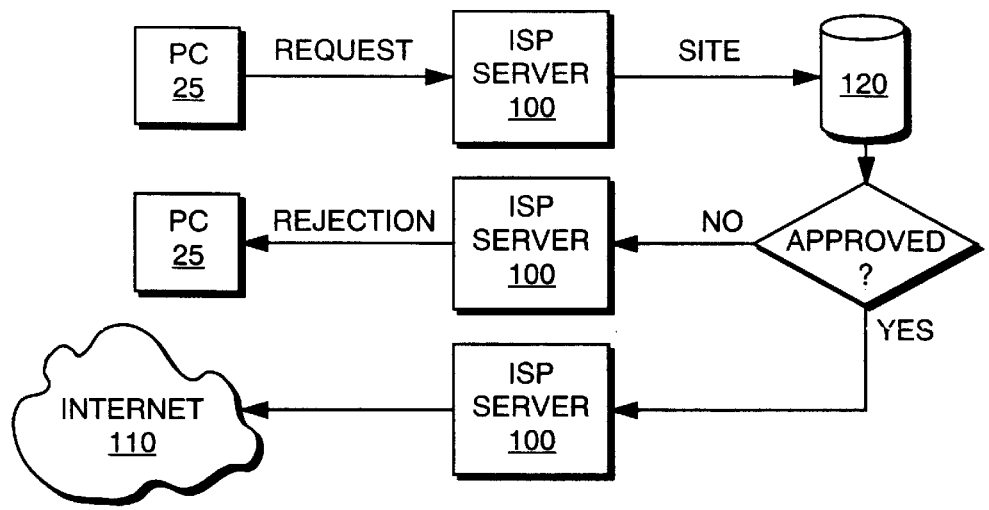
FIG. 4 is a flow diagram showing the Internet access process for a controlled access subscriber.
Figure 5:
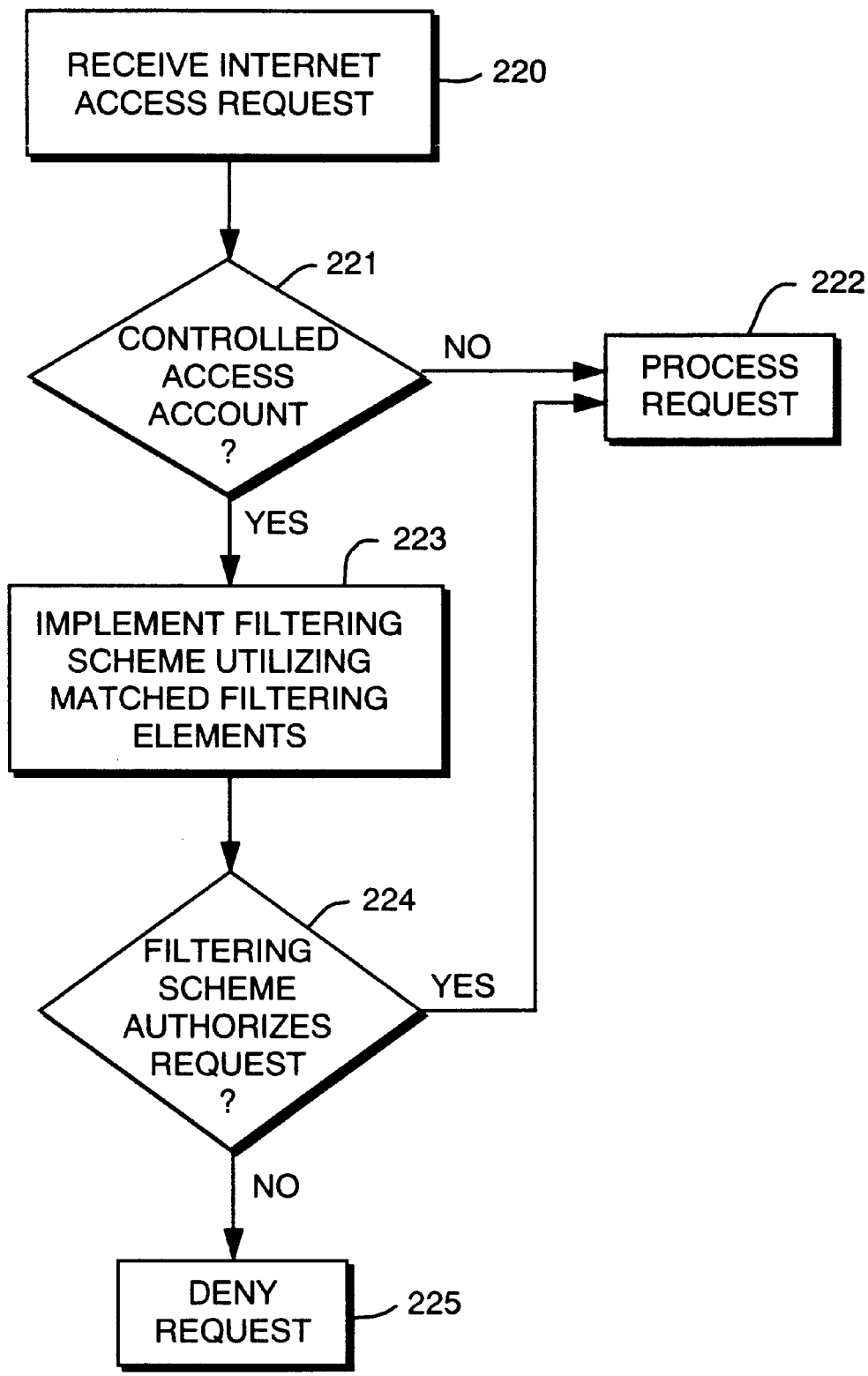
FIG. 5 is a flow diagram showing the ISP server's process for servicing an Internet access request.

FIGS. 4 and 5 show the flow of the Internet access process which is executed when a logged-in subscriber sends a request to the ISP server 100 for Internet access.

The Internet access request process begins when an end-user at a client computer (25 in FIG. 4) sends a request to the ISP server 100 for a web page or other Internet service, such as an FTP request. Typically, these requests are sent from the client 25 by an end-user utilizing a browser. In the preferred embodiment, the request is in the TCP/IP format.

As seen in FIG. 5, ISP server 100 receives an Internet access request 220 from client 25. ISP server 100 determines 221 whether this request is from a controlled access subscriber or an open access subscriber. If the request is from an open access subscriber, the request is processed 222 and forwarded to the Internet 110 in the traditional manner.

If the Internet access request is from a controlled access subscriber, the ISP server 100 implements 223 the filtering scheme associated with the end-user utilizing the customized filtering elements also associated with the user from the ISP database 120. The ISP server 100 determines 224 whether the filtering scheme authorizes the request. If the request is authorized, it is processed 222 and forwarded to the Internet, if not, the ISP server 100 provides the end-user with a rejection notice 225.

For certain filtering schemes, such as wordscreening or phrase-screening schemes, the end-user Internet access request may be partially processed while the ISP server 100 monitors the content for certain words or phrases. The ISP server 100 maintains a table of logged-in end-users associated with this type of filtering scheme. Internet access requests for such end-users are forwarded directly to the Internet 110. The ISP server 100 then monitors all data packets to determine which will be forwarded to users on this table. If a packet is being sent to such a user, the ISP server 100 screens the packet based on the specific filtering scheme and filtering elements. For certain schemes or elements, multiple data packets may have to be buffered. If the data packet or packets trigger the filtering scheme, such as by containing specific words or phrases, the transmission to the user may be terminated. The sending site may be put on a list of excluded sites used in a hybrid exclusive-list word-parsing scheme.

In the preferred embodiment, the ISP server 100 provides a user-friendly HTML message denying the Internet access request when appropriate. This message may contain a statement of a client corporation's "acceptable use policy" if the end-user subscriber is associated with a corporation.

The preferred embodiment further includes a privileged class of controlled access users. These privileged users are typically parents, in the case of family accounts; teachers, for educational accounts; and corporation administrators, for corporate accounts. The privileged users are responsible for selecting the filtering scheme and filtering elements which are associated with controlled access end-user accounts under the privileged user's control. The filtering scheme may be selected from a fixed set of options, or may be further customized by allowing the privileged user to select and combine elements, such as through a graphical user interface from a number of existing filtering schemes.

When a request by a privileged user is denied, the user receives a special denial message which allows the privileged user to override the denial. Alternatively, the privileged user is allowed to modify the filtering schemes and filtering elements (such as exclusive-list sites) associated with the privileged user and controlled-access end-users controlled by the privileged user.

Figure 6:
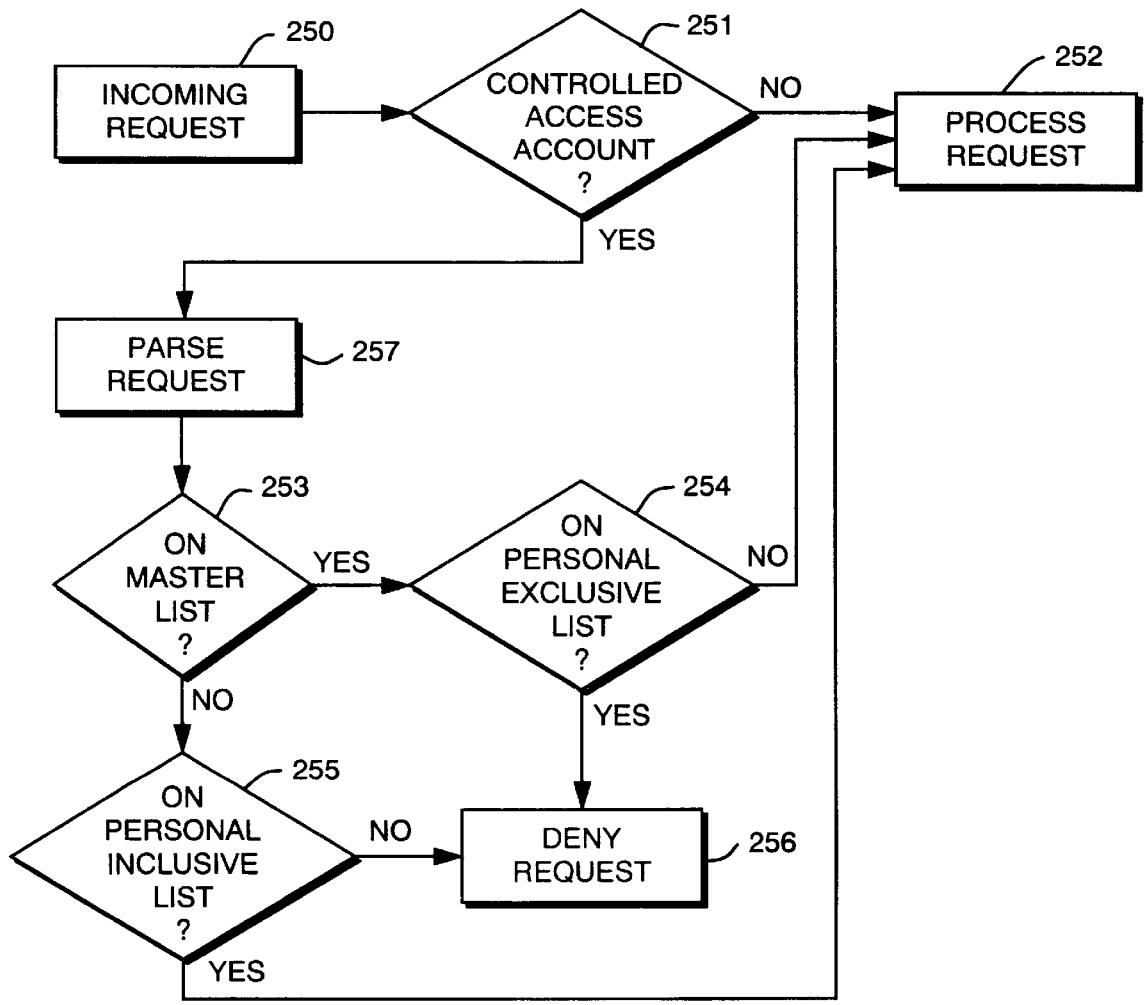
FIG. 6 is a flow diagram showing a preferred filtering scheme of the present invention.

FIG. 6 shows a preferred ISP server filtering scheme comprising a hybrid master inclusive-list combined with personal exclusive and inclusive lists. ISP server 100 receives 250 Internet access requests and determines 251 whether the end-user is a controlled access subscriber. If not, the request is forwarded to the Internet 110 and processed 252. If the request is from a controlled access subscriber, the ISP server 100 parses the request 257 and determines 253 whether the requested site is on a master inclusive-list of allowed sites. In the TCP/IP protocol, each Internet access request or "packet" includes the address of the destination computer from which content is requested. Thus, the parsing routine simply examines this destination address and compares it to the address list. The master inclusive-list may be supplied by the ISP or third-party list suppliers. If the site is on the master inclusive-list, the ISP server then checks 254 the site against the subscriber's personal exclusive-list.

Alternatively, if the site is not on the master inclusive-list, it is checked 255 against the subscriber's personal inclusive-list. If the site is either (i) on the master inclusive—list and not on the personal exclusive-list; or (ii) on the personal inclusive-list, the request is processed 252 and forwarded to the Internet. If not, the request is denied 256 with an HTML message as noted above. The set of filtering elements associated with each end-user account for this preferred embodiment therefore comprise the master inclusive-list and the personal exclusive-list and personal inclusive-list. Any of those lists, as well as any of the other sets of filtering elements described herein, may be optionally set to be empty lists or sets.

Figure 7:
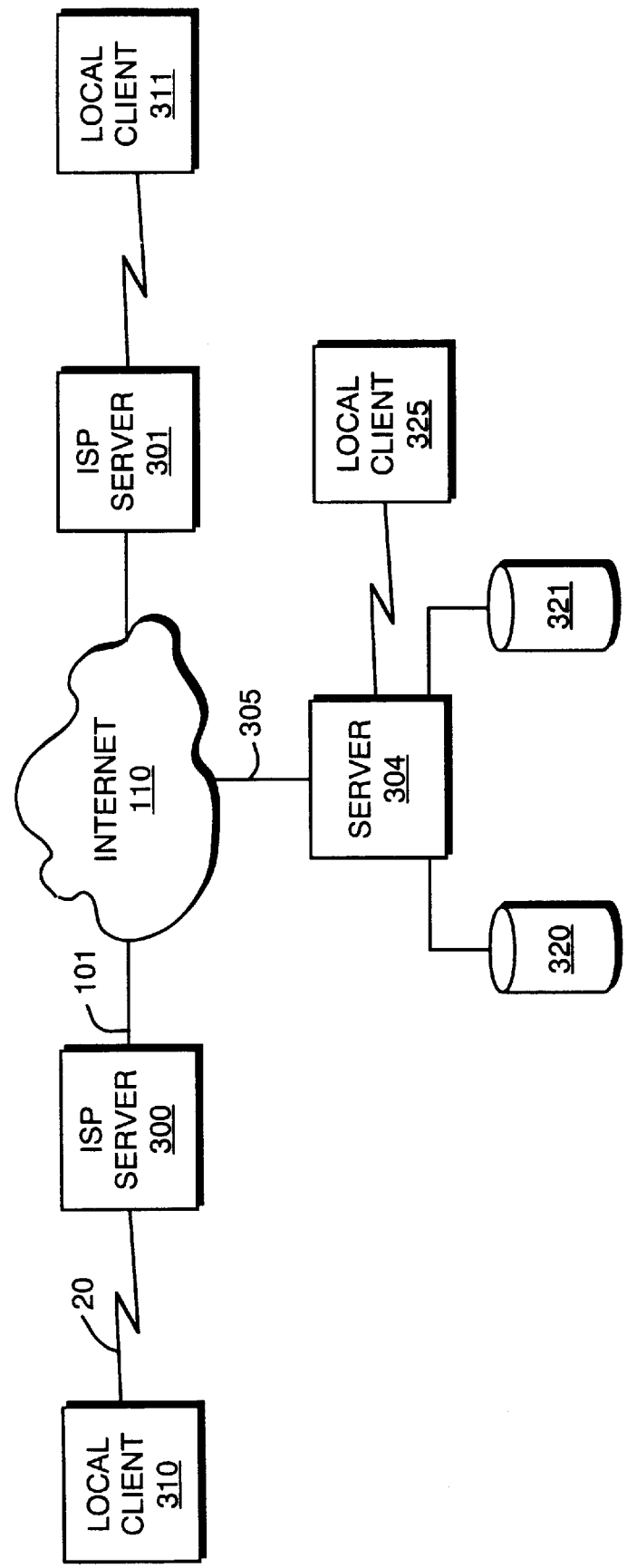
FIG. 7 shows a distributed implementation of the present invention in which filtering schemes and filtering elements may be distributed across a network.
Figure 8:
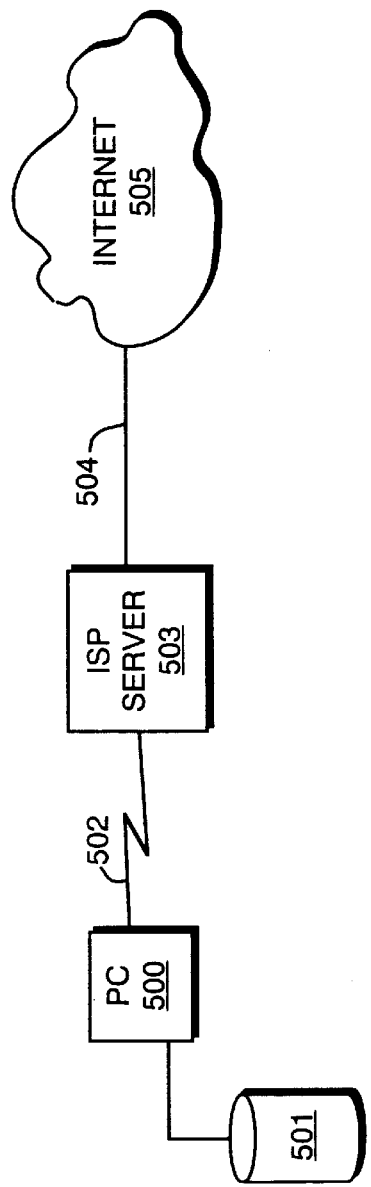
FIG. 8 shows a prior art single-user configuration.
Figure 9:
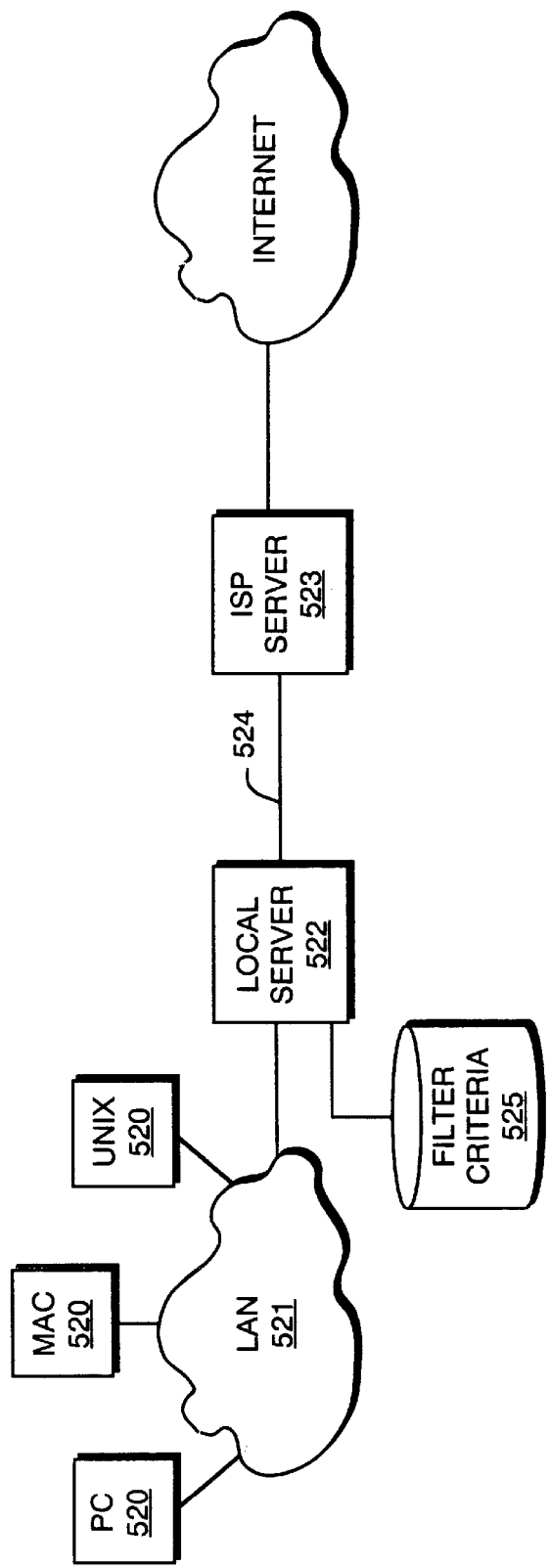
FIG. 9 shows a prior art local area network configuration.

FIG. 7 shows a distributed implementation of the present invention. Local client 310 may access ISP server 300 through a dial-up, or other connection 20. Alternatively, clients may be connected through a local server as shown in FIG. 2. ISP server 300 is coupled to the Internet 110 through a high-speed connection 101. The filtering scheme 321 and sets of filtering elements 320 are stored locally to another server 304 either in main memory or secondary storage such as disk storage on the line. Alternatively, the filtering scheme 321 and filtering elements 320 may be stored on separate servers, such as 300, 304 or 301. Server 304 may be coupled through a connection 305 to the Internet 110 thereby allowing ISP server 300 to access server 304 through an Internet connection. Alternatively, ISP server 300 and server 304 may be coupled directly or through a separate computer network (not shown). ISP server 300 simply queries server 304 for the user's status as a controlled access user and the user's filtering scheme and set of filtering elements, if any. Alternatively, ISP server 300 may forward the local client 310 Internet access requests to server 304 for processing. This distributed architecture allows an end-user, who might normally use local client 325 to dial-up server 304, to access the Internet 110 through different local clients, 310 and 311 as shown on FIG. 7, and Internet points-of-presence, such as through ISP server 300 and 301 as shown in FIG. 7, provided by the Internet Service Provider, while maintaining the user's customized content filtering. Thus, for example, corporation users could use the same ISP while traveling away from the office.

It is understood that various other modifications will be apparent to and can be readily made by those skilled in the art without departing from the scope and spirit of the present invention. For instance, the filtering scheme may be based on any of a plurality of filtering techniques, such as phrase and content filtering or PICS type filtering and consist of any of various types of "programs," such as executable code, interpreted code, script languages, or other high level programs. Additionally, many combinations of such filters are possible. Similarly, the present invention may be applied equally for various types of communications hardware such as ISDN or cable modems and utilize various types of distributed processing across a computer network, such as the Internet itself. Accordingly, it is not intended that the scope of the claims be limited to the description or illustrations set forth herein, but rather that the claims be construed as encompassing all features of patentable novelty that reside in the present invention, including all features that would be treated as equivalents by those skilled in the art.

What is claimed is:

1. A content filtering system for filtering content retrieved from an Internet computer network by individual controlled access network accounts, said filtering system comprising:

a local client computer generating network access requests for said individual controlled access network accounts;

at least one filtering scheme;
a plurality of sets of logical filtering elements; and
a remote ISP server coupled to said client computer and said Internet computer network, said ISP server associating each said network account to at least one filtering scheme and at least one set of filtering elements, said ISP server further receiving said network access requests from said client computer and executing said associated filtering scheme utilizing said associated set of logical filtering elements.

2. The content filtering system of claim 1 further comprising privileged network accounts, said ISP server allowing said privileged network accounts to modify the set of logical filtering elements matched to said controlled access network accounts.

3. The content filtering system of claim 1 further comprising a local server coupled to said local client through a local area network, said remote ISP server being coupled to said local server through a telephonic connection.

4. The content filtering system of claim 1 further comprising a second ISP server coupled to said remote ISP server, said matched set of logical filtering elements being stored locally to said second ISP server.

5. The content filtering system of claim 4, wherein said second ISP server is coupled to said remote ISP server through said Internet computer network.

6. The content filtering system of claim 1 wherein said network access request contains a destination address, said at least one filtering scheme monitoring said destination address of said network access request.

7. The content filtering system of claim 6, wherein said at least one filtering scheme comprises an exclusive-list scheme and said plurality of sets of logical filtering elements comprise lists of excluded Internet sites.

8. The content filtering system of claim 6, wherein said at least one filtering scheme comprises an inclusive-list scheme and said plurality of sets of logical filtering elements comprise lists of allowed Internet sites.

9. The content filtering system of claim 6 further comprising a master set of logical filtering elements comprising a list of excluded sites, said at least one filtering scheme comprising a hybrid exclusive-list inclusive-list scheme, said plurality of logical sets of filtering elements comprising lists of allowed sites, each controlled access network account being associated with at least one list of allowed sites.

10. The content filtering system of claim 9, wherein said hybrid filtering scheme excludes Internet access requests to Internet sites listed on said master list of excluded sites unless said Internet site is listed on said associated list of allowed sites.

11. The content filtering system of claim 9 further comprising a plurality of lists of excluded sites, each controlled access network account being associated with at least one list of said plurality of lists of excluded sites, said hybrid filtering scheme excluding Internet access requests to Internet sites on said master list of excluded sites or said associated list of excluded sites, unless said Internet site is listed on said associated list of allowed sites.

12. The content filtering system of claim 11, wherein said at least one filtering scheme comprises a word-parsing scheme and said plurality of sets of logical filtering elements comprise lists of excluded words, said word-parsing scheme monitoring the content of data packets being forwarded to the controlled access network account for occurrences of words on the list of excluded words associated with said controlled access network account.

13. The content filtering system of claim 1, wherein said at least one filtering scheme monitors the data being forwarded to said remote client computer.

14. A content filtering system for filtering content retrieved from an Internet computer network by individual controlled access network accounts, said system comprising:
a local client computer generating network access requests for said individual controlled access network accounts;
at least one master site list;
a plurality of first personal site lists, each controlled access network account being associated with at least one first personal site list; and
a remote ISP server coupled to said client computer and said Internet computer network, said ISP server receiving said screening said network access requests based on said master site list and said associated first personal site list.

15. The content filtering system of claim 14 further comprising a plurality of second personal site lists, each controlled access network account being associated with at least one second personal site list, said ISP server screening said network access requests based on said master site list and said associated first personal site list and said associated second personal site list.

16. The content filtering system of claim 15, wherein said network access requests comprise a destination address field, said ISP server denying said network access request if said network access request destination address is listed on said associated first personal site list, said ISP server further denying said network access request if said network access request destination address is listed on said master site list and not on said associated second personal site list.

17. The content filtering system of claim 14 further comprising a second ISP server coupled to said remote ISP server, said plurality of first personal site lists and said plurality of second personal site lists being stored locally to said second ISP server.

18. An ISP server for filtering content forwarded to controlled access network accounts accessing an Internet computer network from a remote client computer, said remote client computer generating network access requests containing a destination address, said ISP server comprising:
a plurality of sets of logical filtering elements, each controlled access network account being associated with at least one set of said plurality of sets of logical filtering elements; and
at least one filtering scheme associated with each controlled access network account, said associated filtering scheme for determining whether to allow said network access request based on said at least one logical set of logical filtering elements.

19. The ISP server of claim 18, wherein said at least one filtering scheme monitors said destination address of said network access requests.

20. The ISP server of claim 18, wherein said at least one filtering scheme monitors the data being forwarded to said remote client computer.

21. The ISP server of claim 20, wherein said at least one filtering scheme comprises a word-parsing scheme, said logical filtering elements comprising words.

22. An ISP server for filtering content forwarded to controlled access network account generating network access requests at a remote client computer, each network access request including a destination address field, said ISP server comprising:

a master inclusive-list of allowed sites;

a plurality of sets of exclusive-lists of excluded sites, each controlled access network account associated with at least one set of said plurality of exclusive-lists of excluded sites; and a filtering scheme, said filtering scheme allowing said network access request if said destination address exists on said master inclusive-list but not on said at least one associated exclusive-list, whereby said controlled access accounts may be uniquely associated with one or more sets of excluded sites.

23. The ISP server of claim 22 further comprising:

a plurality of inclusive-lists of allowed sites, each controlled access user associated with at least one of said plurality of inclusive-lists of allowed sites, said filtering program further allowing said network access request if said requested destination address exists on said at least one associated inclusive-list.

24. A method for filtering content retrieved from an Internet computer network by a controlled access account, said method comprising the steps of:

transmitting a network access request associated with said controlled access account from a local client computer;

receiving said network access request at a remote ISP server;

associating said network access request with a set of logical filtering elements from a plurality of sets of logical filtering elements stored remotely from said local client;

executing a filtering scheme on said ISP server, said filtering scheme utilizing said associated set of logical filtering elements; and transmitting said network access request from said ISP server to said Internet computer network if said filtering scheme accepts said network access request and transmitting a rejection from said ISP server to said client computer if said filtering scheme denies said network access request.

25. The method for filtering content retrieved from an Internet computer network of claim 24 further comprising the step of associating said network access request with a filtering scheme from a plurality of filtering schemes stored remotely form said local client.

* * * * *

UNITED STATES PATENT AND TRADEMARK OFFICE
CERTIFICATE OF CORRECTION

PATENT NO.   : 5,987,606
DATED        : November 16, 1999
INVENTOR(S)  : Cirasole et al.

It is certified that error appears in the above-identified patent and that said Letters Patent is hereby corrected as shown below:

Column 8,
Line 16, delete "said screening" and replace with -- and screening --.

Signed and Sealed this

Twenty-fifth Day of April, 2006

JON W. DUDAS
*Director of the United States Patent and Trademark Office*